W. H. HARRISON.
BLOWING ENGINE-VALVES.

No. 195,361. Patented Sept. 18, 1877.

Witnesses
Henry Howson Jr.
Harry Smith

Inventor
William H. Harrison
by his Attorneys
Howson and Son

UNITED STATES PATENT OFFICE.

WILLIAM H. HARRISON, OF NEWCASTLE, PENNSYLVANIA.

IMPROVEMENT IN BLOWING-ENGINE VALVES.

Specification forming part of Letters Patent No. 195,361, dated September 18, 1877; application filed July 28, 1877.

*To all whom it may concern:*

Be it known that I, WILLIAM H. HARRISON, of Newcastle, Lawrence county, Pennsylvania, have invented a new and useful Improvement in Valves and Valve-Seats for Blowing-Engines, of which the following is a specification:

The object of my invention is to provide a blowing-cylinder with simple and sensitively-operating inlet and discharge valves; and this object I attain in the manner which I will now proceed to describe, reference being had to the accompanying drawings, in which—

Figure 1:
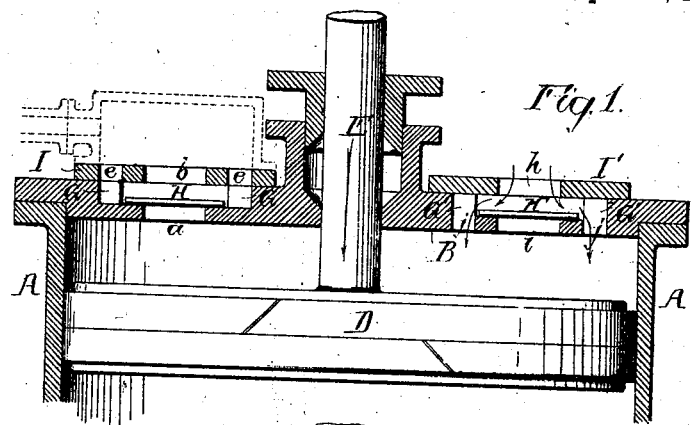
Figure 2:
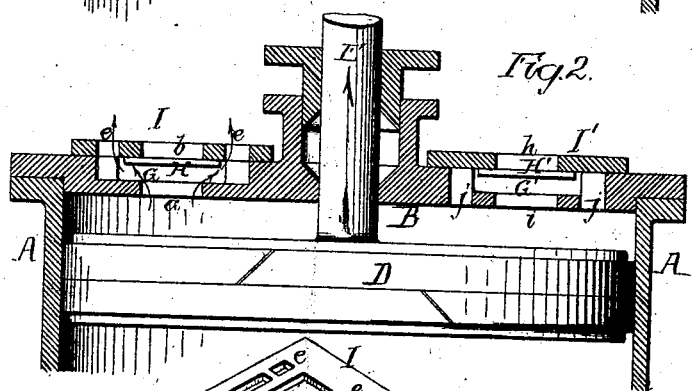
Figure 3:
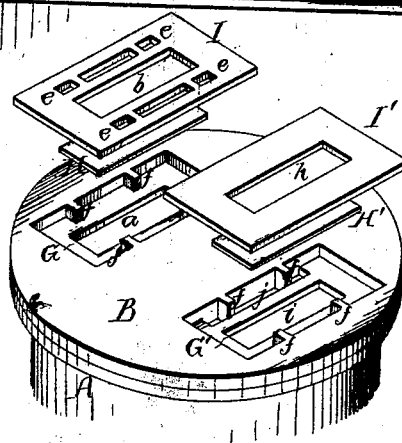

Figures 1 and 2 are vertical sections of sufficient of a blowing-cylinder to illustrate my invention; Fig. 3, a perspective view of Figs. 1 and 2, showing the valves removed from their chambers on the cylinder-cover; and Fig. 4, a perspective view, showing a modification of my invention.

A represents the upper portion of a blowing-cylinder; B, the cylinder-cover; D, the piston; and E, the piston-rod, passing through a central stuffing-box on the cover.

The cylinder-cover has two valve-chambers, G and G', formed, in the present instance, by recessing the cover and securing plates I I' above the recesses. G is the outlet-chamber, containing the discharge-valve H, which, on the descent of the piston, bears on the bottom of the chamber and closes the outlet-opening $a$, as shown in Fig. 1; but, on the ascent of the piston, bears against the under side of the plate I and closes the central openings $b$ in the said plate, as shown in Fig. 2, the compressed air escaping through the outlet-opening $a$, through the chamber G, and thence through the side openings or ports $e\ e$ in the said plate I, to a receiving-chest, (shown by dotted lines in Fig. 1,) where the compressed air is directed by suitable pipes or ducts to any desired point. G' is the inlet-chamber, containing a valve, H', which, when the piston rises, bears against the under side of the plate I' and closes the inlet-opening $h$ in the said plate, as shown in Fig. 2, the valve, when the piston descends, falling to the bottom of the chamber, and bearing on the same and closing the opening $i$, while the external air passes through the opening $h$ in the plate I', thence into the chamber G', and thence, through side openings $j\ j$ in the bottom of the chamber, into the cylinder.

The valves may consist of leather, wood, or metal, or of a combination of these materials, and may be guided laterally by lugs $f\ f$, projecting from the sides of the recess, or in any other suitable manner.

It has not been deemed necessary to illustrate the valves at the lower or opposite end of the cylinder, as they are too similar to those described above to need description.

It will also be understood that, although I have shown in the present instance but one inlet and one outlet valve in the cylinder-cover, there may be as many of these valves at both ends of the cylinder as the diameter of the latter may suggest.

It is not essential that the valve-chambers should be formed in the covers of the cylinder, as shown, as chests containing the valves and having the openings described may be secured to the covers.

Figure 4:
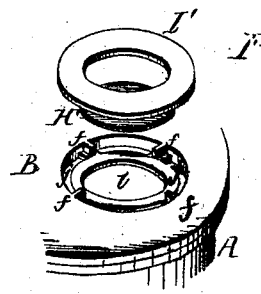

I prefer to make the valve-chambers and valves of the quadrangular shape shown in Figs. 1, 2, and 3; but they may be of other shapes, circular, for instance, as shown in Fig. 4.

The opening $b$ in the plate I is not a port for the escape of compressed air from the outlet-chamber G, nor is the opening $i$ in the bottom of the chamber G' a port for the admission of external air to the cylinder; but these openings or ports constitute an essential feature of my invention, as they insure that sudden and sensitive action of the valves upon which the efficient, uniform, and economical working of the blowing-engine depends. This will be best understood by supposing that there is no opening $b$ in the plate I, in which case, while the valve might operate, it would be more or less sluggish in its action.

As regards the valve H', the opening $i$ permits the air under pressure to act on such an extended area of the valve that the prompt action of the latter must be assured.

Among other advantages of my improvements may be mentioned the protection of the valves by confining them in chambers, general simplicity in construction, and the accessibility of the valves.

I claim as my invention—

1. The within-described valve apparatus, consisting of a valve-chamber and valve, an air inlet or outlet, the central opening $b$ or $i$, and side ports, for the passage of the air, all substantially as set forth.

2. The combination, in the cylinder-cover, of any desired number of valve-chambers, each chamber containing a valve, and having inlets and outlets and a detachable cover, all substantially as described.

In testimony whereof I have signed my name to this specification in the presence of two subscribing witnesses.

WILLIAM H. HARRISON.

Witnesses:
GEO. B. BERGER,
GEO. W. HARTMAN.